(12) United States Patent
Baeck et al.

(10) Patent No.: US 8,945,792 B2
(45) Date of Patent: Feb. 3, 2015

(54) SEPARATOR FOR FUEL CELL

(71) Applicant: Hyundai Motor Company, Seoul (KR)

(72) Inventors: Suk Min Baeck, Gyeonggi-do (KR);
Sang Mun Jin, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/801,768

(22) Filed: Mar. 13, 2013

(65) Prior Publication Data

US 2014/0178798 A1    Jun. 26, 2014

(30) Foreign Application Priority Data

Dec. 20, 2012  (KR) .................. 10-2012-0149223

(51) Int. Cl.
*H01M 8/04* (2006.01)
*H01M 8/02* (2006.01)

(52) U.S. Cl.
CPC .................................. *H01M 8/0202* (2013.01)
USPC ......................................... 429/508; 429/456

(58) Field of Classification Search
USPC .................. 429/518, 456, 457, 458, 463, 508
See application file for complete search history.

(56) References Cited

U.S. PATENT DOCUMENTS

| | | | |
|---|---|---|---|
| 2005/0136315 A1* | 6/2005 | Yamauchi et al. | 429/35 |
| 2006/0127744 A1 | 6/2006 | Yamaga et al. | |
| 2009/0017355 A1* | 1/2009 | Kawabata et al. | 429/30 |

FOREIGN PATENT DOCUMENTS

| | | |
|---|---|---|
| JP | 2009016067 A | 1/2009 |
| KR | 10-0551809 B1 | 2/2006 |
| KR | 10-2007-0093734 A | 9/2007 |
| KR | 10-2009-0128602 A | 12/2009 |
| WO | 02/093672 A2 | 11/2002 |

OTHER PUBLICATIONS

Korean Office Action issued in Application No. 10-2012-0149223 dated Jan. 10, 2014.

* cited by examiner

*Primary Examiner* — Mark F Huff
*Assistant Examiner* — Monique Wills
(74) *Attorney, Agent, or Firm* — McDermott Will & Emery LLP

(57) ABSTRACT

A separator for a fuel cell includes a metal plate which defines a passage and a manifold, frames having gaskets which are integrated therewith using injection, and a bonding unit for bonding the frames to the metal plate. The gaskets may be differently formed. This resolves process interference problems between conductive surface treatment and gasket cross-linking, obviates deburring of the gasket, and prevents poor injection of the gaskets, which ensures stable quality of the separator, increases productivity and decreases the manufacturing cost.

3 Claims, 3 Drawing Sheets

SEPARATOR FOR FUEL CELL

CROSS-REFERENCE TO RELATED APPLICATION

This application claims benefit of priority to Korean Patent Application No. 10-2012-0149223, filed on Dec. 20, 2012 in the Korean Intellectual Property Office, the disclosure of which is incorporated herein in its entirety by reference.

TECHNICAL FIELD

The present disclosure relates to a separator for a fuel cell, and more particularly to the structure of a separator for a fuel cell.

BACKGROUND

A fuel cell system includes a solid polymer electrolyte membrane, one side of which is provided with a cathode and the other side of which is provided with an anode. This system purports to provide an external load power generated depending on an electrochemical reaction between oxygen in air supplied to the cathode and hydrogen supplied to the anode.

A fuel cell stack is formed by vertically stacking a plurality of unit cells, each including: a cathode, through which an oxidation gas flows; an anode, through which a reduction gas flows; and a polymer electrolyte membrane.

Among these, a separator is provided in the fuel cell system to perform the following functions. The separator functions as a passage for supplying the reduction gas and the oxidation gas to the cells in the fuel cell stack, and as a passage for supplying cooling water to cool the stack, and as a passage for transferring generated current.

Such a separator should have air tightness or liquid tightness so that the reduction gas and the oxidation gas are not mixed with the cooling water. To ensure air tightness, the surface of the separator is provided with a gasket using a rubber seal to maintain fluid or gas tightness and to keep-up a surface pressure.

FIGS. 1 and 2 illustrate the separator 500 and the gasket 502, in which an adhesive 504 is applied on the surface of the separator 500 and then the gasket 502 made of a rubber seal is formed thereon via injection.

The separator 500 is manufactured via introduction of a material, formation of a passage (stamping), conductive surface treatment and integrated gasket injection, in order. The integrated gasket 502 of the separator 500 is formed by performing integrated gasket injection on the surface of the separator 500 under a condition of an edge of the separator 500 being held by a gasket injection mold under pressure.

The separator 500 having the integrated gasket 502 should be exposed to a temperature of 200° C. or higher for a long period of time so as to cross-link a gasket material, undesirably causing process interference problems with the conductive surface treatment. In the case where the gasket material escapes from the gap between the separator and the gasket mold upon integrated injection, it should be removed using deburring. In the course of deburring, physical damages to the surface of the separator may occur, remarkably increasing defect rates.

To manufacture a finished separator, the aforementioned four processes should be carried out. When defects are created during the gasket injection, the manufacturing costs of the preceding processes may be undesirably added to defect costs.

The foregoing is intended merely to aid in the understanding of the background of the present inventive concept, and is not intended to mean that the present inventive concept falls within the purview of the related art that is already known to those skilled in the art.

SUMMARY

Accordingly, the present disclosure has been made keeping in mind the above problems encountered in the related art, and an object of the present disclosure is to provide a separator for a fuel cell. A gasket of the separator may be differently formed, which resolves process interference problems between conductive surface treatment and gasket cross-linking, obviates the need for deburring of the gasket, and prevents poor injection of the gasket. This ensures stable quality of the separator, increases productivity and decreases the manufacturing cost, ultimately contributing to an improvement in the quality of the fuel cell.

In order to accomplish the above object, an aspect of the present disclosure provides a separator for a fuel cell, including a metal plate which defines a passage and a manifold; frames having gaskets which are integrated therewith using injection; and a bonding unit for integratedly bonding the frames to the metal plate.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF SPECIFIC EMBODIMENTS

Figure 1:
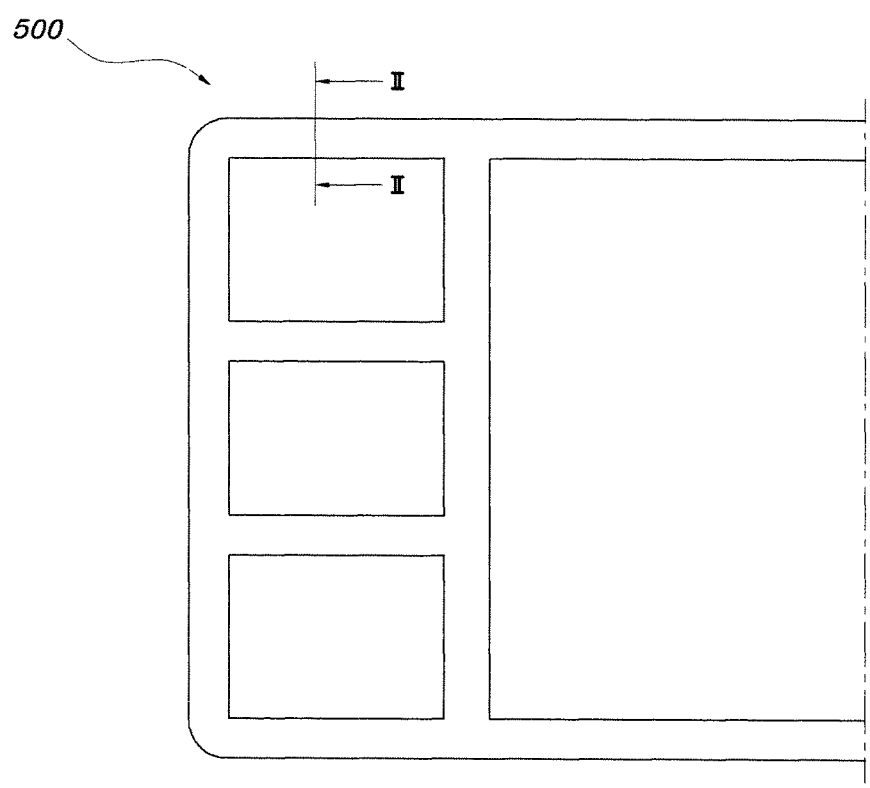
FIG. 1 is a view illustrating the structure of a separator for a fuel cell according to a conventional technique.
Figure 2:
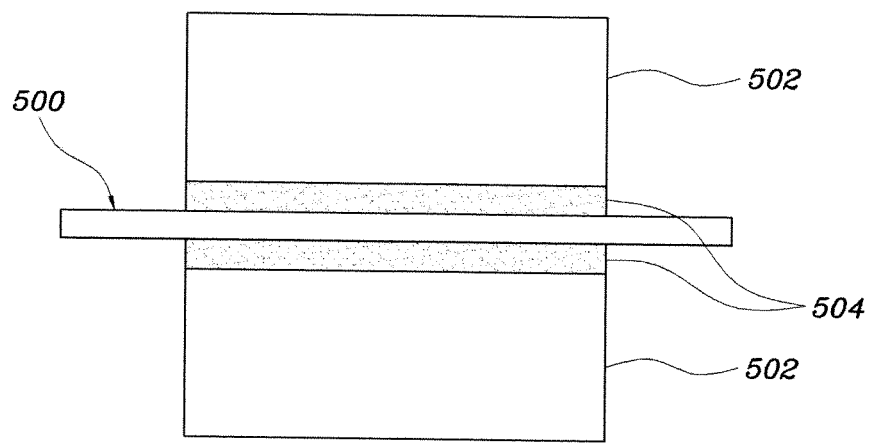
FIG. 2 is a cross-sectional view taken along the line II-II of FIG. 1.
Figure 3:
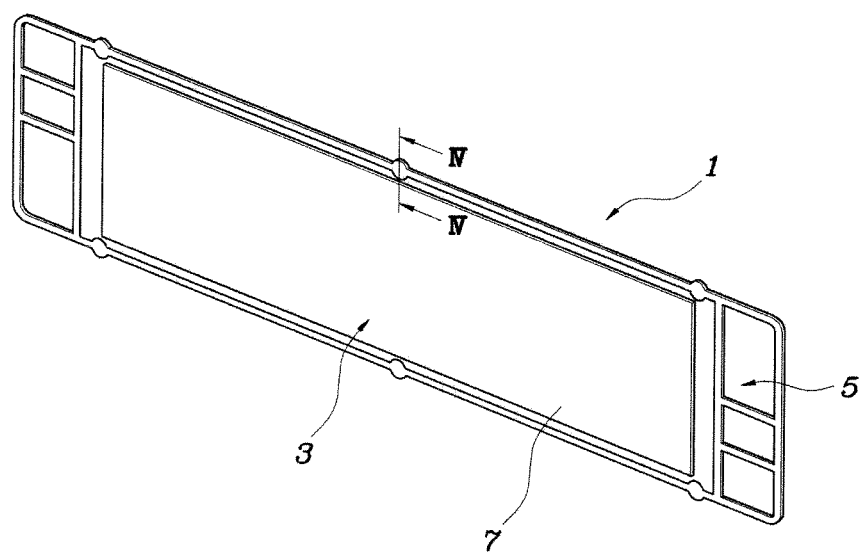
FIG. 3 is a view illustrating the structure of a separator for a fuel cell according to an example of the present disclosure.
Figure 4:
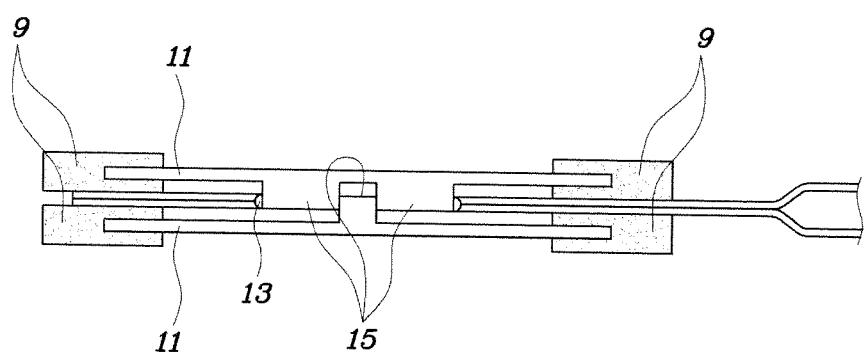
FIG. 4 is a cross-sectional view taken along the line IV-IV of FIG. 3.

With reference to FIG. 3, a separator 1 for a fuel cell according to an example of the present disclosure includes a metal plate 7 which forms a passage 3 and a manifold 5, frames having gaskets 9 that are integrated therewith using injection, and a bonding unit for integratedly bonding the frames 11 to the metal plate 7.

Compared to conventional techniques in which the gasket is integratedly injected on the separator, the separator 1 according to the example is configured such that the metal plate 7 which forms the passage 3 and the manifold 5, and the frames 11 having the integratedly injected gaskets 9 are separately produced and then assembled, thus completing a single separator 1. Thereby, compared with the conventional production of a separator, the production process of the example prevents interference problems between conductive surface treatment and gasket cross-linking and poor injection of the gasket, and makes it possible to omit deburring of the gasket. This enhances productivity of the separator, reduces the manufacturing cost thereof, and ensures stable quality of the separator, thereby contributing to increasing quality of a fuel cell.

Also, the gasket is not directly injected on the metal plate 7, thus obviating the need for applying a releasing agent before gasket injection, which thereby remarkably decreases pollution of the metal plate 7 and greatly contributes to an increase in quality of a fuel cell.

The frames 11 are respectively bonded to both sides of the metal plate 7, and the bonding unit is configured such that the frames 11 at both sides of the metal plate 7 are bonded to each other.

The bonding unit includes a bonding hole 13 formed in the metal plate 7, and bonding protrusions 15 having a convex structure. The convex structure includes one bonding protrusion, which protrudes from the frame 11 positioned at one side of the metal plate 7 and passes through the bonding hole 13, and the other bonding protrusion, which protrudes from the frame 11 positioned at the other side of the metal plate and passes through the bonding hole 13. The bonding protrusions are complementarily fitted with each other.

The frames 11 are configured such that the bonding protrusions are enclosed by the gaskets around the bonding protrusions, and the peripheral edges of the frames 11 are held in the gaskets 9.

The metal plate 7 and the frames 11 are separately manufactured and then assembled using the bonding unit, thereby completing the separator 1.

As described hereinbefore, the present disclosure provides a separator for a fuel cell. According to the present disclosure, a gasket of the separator can be differently formed, thus solving process interference problems between conductive surface treatment and gasket cross-linking upon conventional production of a separator, obviating the need for deburring of the gasket, and preventing poor injection of the gasket, thereby ensuring stable quality of the separator while increasing productivity and decreasing the manufacturing cost, ultimately contributing to an improvement in the quality of the fuel cell.

Although the preferred embodiments of the present disclosure have been disclosed for illustrative purposes, those skilled in the art will appreciate that various modifications, additions and substitutions are possible, without departing from the scope and spirit of the inventive concept as disclosed in the accompanying claims.

What is claimed is:

1. A separator for a fuel cell, comprising:
   a metal plate which defines a passage and a manifold;
   frames having gaskets which are integrated therewith using injection; and
   a bonding unit for bonding the frames to the metal plate, wherein the bonding unit comprises:
   a bonding hole disposed in the metal plate; and
   bonding protrusions including one bonding protrusion, which protrudes from the frame positioned at one side of the metal plate and passes through the bonding hole, and the other bonding protrusion, which protrudes from the frame positioned at the other side of the metal plate and passes through the bonding hole, the two bonding protrusions being complementarily fitted with each other.

2. The separator of claim 1, wherein the frames are respectively bonded to both sides of the metal plate, and the bonding unit is configured such that the frames at both sides of the metal plate are bonded to each other.

3. The separator of claim 1, wherein the frames are configured such that the bonding protrusions are enclosed by the gaskets around the bonding protrusions, and the peripheral edges of the frames are held in the gaskets.

* * * * *